INVENTOR.
RICHARD I. GAINES
ATTORNEYS

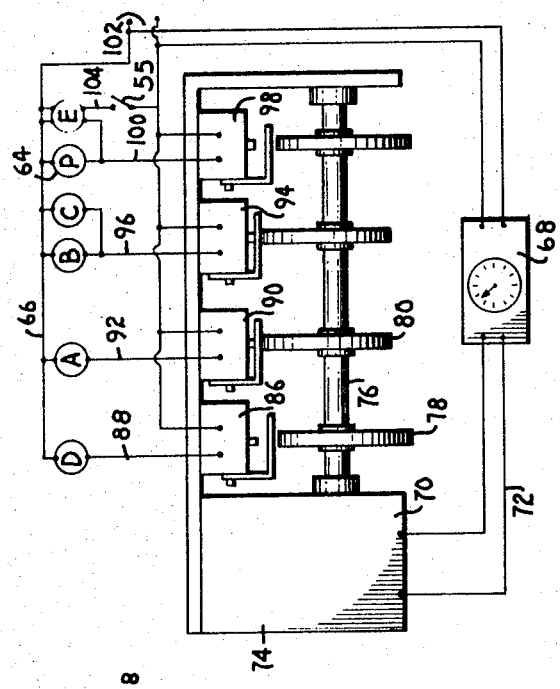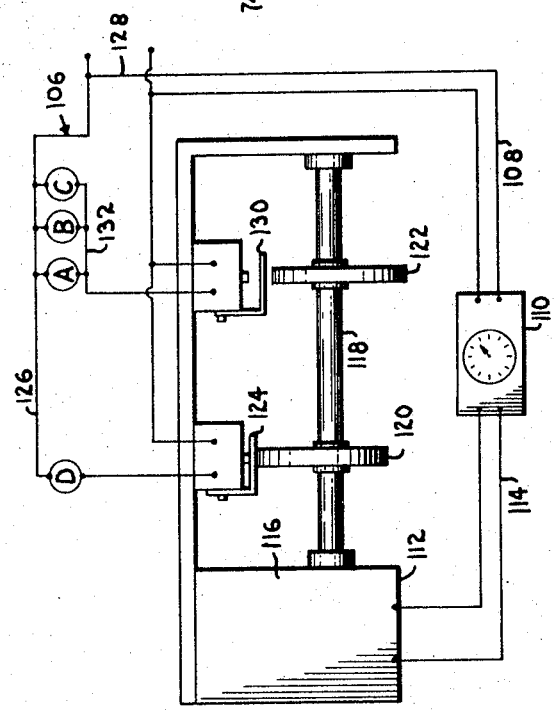

United States Patent Office 3,454,492
Patented July 8, 1969

3,454,492
METHOD OF SOFTENING WATER AND REGENERATING THE BASE EXCHANGE BED
Richard I. Gaines, 1100 E. Alameda,
Roswell, New Mex. 88201
Filed June 20, 1966, Ser. No. 558,684
Int. Cl. C02b 1/76; B01d 15/06
U.S. Cl. 210—35      2 Claims

ABSTRACT OF THE DISCLOSURE

A base exchange bed is regenerated by (1) pumping partially used brine solution upwardly through the bed, (2) passing hard water from the water distribution system through a brine chamber to effect a flow of concentrated brine solution from said chamber upwardly through the bed and collecting a portion of the used solution, and (3) rinsing the bed with hard water.

---

The present invention relates to a pressurized chemical injection system and more particularly, to a method for the regeneration of a base or ion exchange material in a water softening system.

Heretofore, various systems have been utilized for the regeneration of a base exchange or zeolitic material such as green sand or double silicates in water softeners to expel calcium, magnesium and other minerals from hard water and effect a softening of said water. As the zeolitic material retains the minerals removed from the hard water, such prior art systems normally pass a brine solution such as a sodium chloride solution through the bed of zeolitic material under a relatively low flow pressure and thereby effect only a partial regeneration of the zeolitic material.

The principal objects of this invention are: to provide a method for the effective regeneration of a treating or base exchange material in a water softening system; to provide such a method which will effectively apply a brine solution to a bed of zeolitic material to regenerate said material and agitate said material to expose substantially all of said material to said brine solution; to provide such a method for regeneration by passing said brine solution through said bed under pressure to effect a positive flow through said bed in an upward direction to effectively fluff or reposition the particles of zeolitic material so as to expose all surfaces of said particles to the brine solution for substantially complete regeneration.

FIG. 2 is a circuit diagram of the timing and control device which actuates the valves of the system illustrated in FIG. 1 with a cam actuated switching means illustrated in mechanical form.

FIG. 3 is a circuit diagram of modified form of the timing and control device where the brine storage and reuse system is not employed with a cam actuated switching means illustrated in mechanical form.

Figure 1:
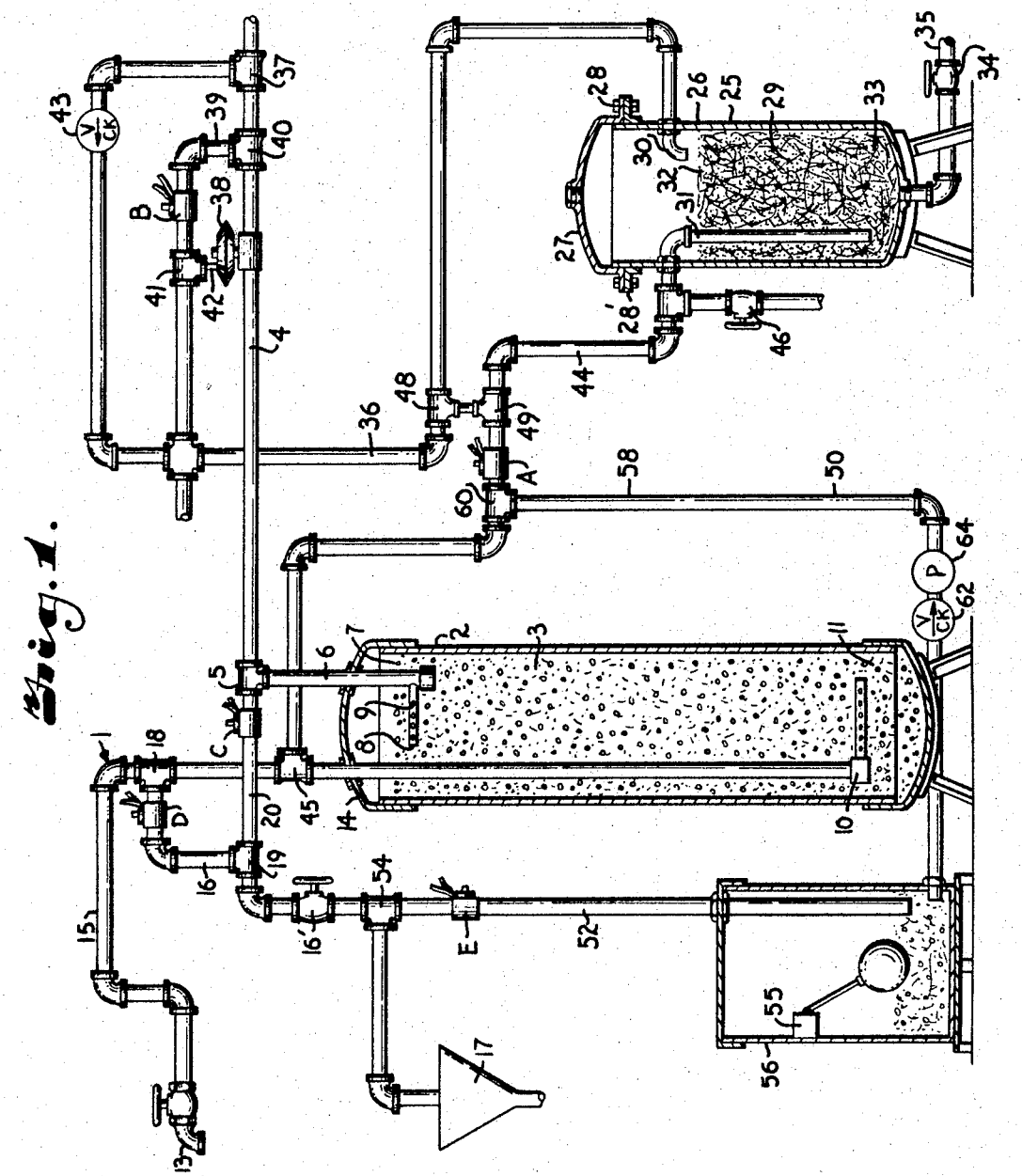
FIG. 1 is a diagrammatic side elevational view of an apparatus arranged in accordance with my invention with the water softening tank and the brine solution tank shown in section.

This invention contemplates a method of softening raw or hard water or water from a municipal or other supply by the passage of said water through a bed or base exchange material and the regeneration of said material by the passage through said bed of a brine solution. Prior to the consumption or utilization of the raw water, it is passed through a bed of zeolitic material which effects a base exchange with said water to effectively remove such minerals as calcium and magnesium to soften said water. Once the zeolitic material has accepted its limit of such minerals from the water, the zeolitic material is regenerated by the passage through said material of a brine solution. The brine solution, in effect, activates an exchange of the minerals removed from the water from the zeolitic material to the brine solution in exchange for the base material or elements of said brine solution. This invention further contemplates the agitating, churning or fluffing of the base material to expose substantially all of the material to the brine solution by the passage or flow of the brine solution through the bed of zeolitic material in an upward direction under relatively high flow pressure effecting a positive upward flow through said zeolitic material causing the particles of zeolitic material to be lifted and rotated within the brine solution or fluffed so as to expose all surfaces of said particles to the brine solution to effect a substantially complete regeneration of the zeolitic material. Once the brine solution has been passed through the bed of zeolitic material and removed therefrom, wash water is passed through said zeolitic material to remove any remaining brine solution from the zeolitic bed. The wash water is disposed or removed from the system to prevent the consumption or utilization of said solution or wash water. The brine solution is diverted to a storage tank for re-use to conserve the amount of brine required. The brine so diverted is then used for base exchange during the next cycle of regeneration in addition to new brine solution. After the disposal of the solution and wash water from the system, the softening process may be repeated by again passing the raw water through the bed of zeolitic material.

Referring to drawings in more detail:

The reference numeral 1 generally refers to a system for the softening of hard water and embodying the features of this invention. In the system 1, the raw or hard water is delivered to a primary or softening tank or container 2 which contains a bed 3 of base or ion exchange material such as green sand or double silicates which are commonly known as "zeolites." The tank 2 is illustrated as a closed vertical cylinder and is suitably sealed to withstand the pressures of a water supply distribution system.

The raw or hard water is delivered to the softening tank 2 by means of a water distribution pipe line 4 which is operatively connected to a water distribution system such as a city distribution system (not shown) to provide a source of raw water under pressure. In the illustrated embodiment, a T fitting 5 is suitably mounted in the distribution line 4 with a vertical pipe section 6 serving to extend the distribution line 4 into the upper portion 7 of the zeolitic bed 3. A distributor 8 is mounted by suitable means on the vertical pipe section 6 in communication therewith to receive the flow of raw or hard water from the distribution line 4 and to distribute said water horizontally across the upper portion 7 of the zeolitic bed 3. The distributor 8 may be of any conventional type having a plurality of slots or apertures 9 disposed longitudinally along said distributor to permit the escape of raw water from the distribution line 4 into the zeolitic bed 3.

A second distributor 10 is located in the lower portion 11 of the zeolitic bed 3 and receives the water after its passage through the zeolitic bed 3 for transmission of said water through a flow piping section 12 to its point of discharge or location of consumption or utilization such as a water outlet or tap 13. On the illustrated structure, the piping section 12 extends vertically through the zeolitic bed 3 and outwardly through the top or upper cover 14 of the softening tank 2.

The piping section 12 has a first or outlet branch 15 which connects the water softening tank 2 to the water tap 13. The piping section 12 has a second or disposal branch 16 with a normally open valve 16' therein through which liquid from the softening tank 2 may be diverted to a drain means 17. The piping section 12 is illustrated as having a T fitting 18 downstream from the softening tank 2 by which the disposal branch 16 is connected to the piping section 12. A second T fitting 19 is operatively mounted within the disposal branch 16 connecting said disposal branch 16 to the water distribution line 4. The disposal branch 16 is extended to a drain 17 in which liquid may be disposed. The disposal branch 16 has a valve D operatively connected therein adjacent the T fitting 18 and downstream therefrom to regulate the flow of liquid through the disposal branch 16 of the pipe section 12. The valve D will be open when the brine solution is being removed from the softening tank 2 and during subsequent washings of the zeolitic bed 3 to remove remaining brine.

A valve C is located in a section or portion 20 of the line 4, said section 20 interconnecting the T fittings 5 and 19 and said valve C being operable in its closed position to direct the flow of water in the distribution line 4 downwardly through pipe section 6 and into the zeolitic bed 3 and in its open position, to allow the passage of brine solution upwardly through pipe section 6 through pipe section 20 and into the disposal branch 16.

In the illustrated example, the washing of the zeolitic bed after application of the brine solution is accomplished by a downward flow from distributor 8 to distributor 10. The washing water is then disposed upwardly through the discharge line 12, valve D and outwardly through the disposal branch 16. When the system 1 is operating under its normal softening process or cycle not during a regeneration process or cycle, the hard water, like the washing water, passes through the zeolitic bed from distributor 8 to distributor 10, then upwardly through pipe section 12 and outwardly through the outlet branch 15 to its ultimate use, for example, the tap 13.

The brine solution which is utilized for regeneration of the zeolitic bed 3 is formed in a brine tank or container 25 which is illustrated as a closed cylindrical tank having a body portion 26 and a removable cover portion 27 which is mounted to the body 26 of tank 25 by means of a plurality of nut and bolt assemblies 28 clamping together a circumferential flange 28' on each of the body portion 26 and the cover portion 27. A bed 29 containing an appropriate salt is contained in tank 25 and may be replenished by removal of cover 27. The tank 25 is pressurized such that it is capable of withstanding the pressure of the water distribution to which it is operatively connected. The tank 25 has an inlet pipe 30 and an outlet pipe 31. The inlet pipe 30 is located above the salt bed 29 to provide water in the upper portion 32 of salt bed 29 which upon filtration through said salt bed 29 forms a brine solution which is taken from the tank 25 through the outlet pipe 31 from the lower portion 33 of bed 29. The brine tank 25 includes a drain valve 34 operatively connected to a drain line 35 suitably connected to the lower portion of the brine tank 25.

A water supply piping section 36 operatively connects the distribution line 4 with the inlet pipe 30 of the brine tank in order to provide water to said tank under the pressure of the distribution system for the manufacture of the brine solution. The supply pipe section 36 is operatively connected to the distribution line 4 by means of a T fitting 37 which is upstream from a diaphragam valve 38 operatively mounted within the distribution line 4. A valve B is located on a pressure control line or piping section 39 between a T fitting 40 downstream from T 35 and a restrictor T 41, said restrictor T 41 having a pipe section 42 operatively connected to the diaphragm valve 38. The valve B is operable to open pipe section 39 to allow the passage of water from the distribution line 4 through said pipe section 39 and through pipe section 42 by means of the restrictor T 41 to apply pressure on the diaphragm valve 38 to close said valve and close the distribution line 4 downstream from valve 38, thus allowing the complete flow of water from the distribution line 4 through the piping section 36. The piping section 39 extends from the restrictor T 41 to the drain 17. A check valve 43 is operatively connected in piping section 34 to insure flow only toward the brine tank 25.

A brine supply piping section 44 is operatively connected to the outlet pipe 31 of the brine tank 25 and the discharge line 12 from the softening tank 2, said piping section 44 being connected to the discharge line 12 by means of a T 45. The piping section 44 contains a valve 46 operatively mounted therein adjacent the brine tank 25 for the relief of pressure in the system 1. A two-way valve A is operatively mounted in piping section 44 to keep said piping section 44 closed during the water softening cycle of or process. The pressure from the distribution line 4, as applied through the brine tank 25, forces the brine solution through the brine supply piping section 41 and downwardly through the discharge line 12 and outwardly within the zeolitic bed through the distributor 10. Where sufficient pressure does not exist in a distribution system, a pump may be inserted to move brine from the brine tank 25 to the zeolitic bed 3. A pair of restrictor T's 48 and 49 are operatively mounted in the piping sections 36 and 44 respectively to interconnect said piping sections to permit the dilution of the brine solution leaving the brine tank 25. The restrictor T's 48 and 49 permit a flow of fresh water from the water supply piping section 36 into the brine supplying piping section 44, thereby reducing the brine to the desired strength. It is desirable to maintain the brine solution at about 20 to 50 percent brine strength; therefore, it is necessary to dilute the brine solution passing from the brine tank 25.

The system 1, as illustrated, includes a brine storage and recirculating system 50 for storage and reuse of brine solution after passage of the solution through the bed of zeolitic material. The system 50 includes an intake line 52 operatively connected to the disposal branch 16 of the discharge line 12 between the valve D and the drain 17 by T fitting 54. The intake line 52 extends from the disposal branch 16 to a brine storage container 56 through a valve E which is operable to open and close the intake line 52. In the illustrated embodiment, the valve E is of a double valve variety having a pair of valve stems, either of said stems being operable to close line 52 with one of said stems actuated by a float switch 55 suitably connected in the storage container 56 and the other stem actuated by a timing mechanism during the regeneration process.

The brine system 50 also includes an out-flow line 58 which extends from the storage container 56 to the brine solution supply line or piping section 44 by a T fitting 60 in the brine supply line 44 between valve A and the distributor 10 in tank 2. The out-flow line 58 includes a check valve 62 and a pump 64 for elevating the used brine solution from the container 56 to the discharge line 12 and to provide adequate pressure for driving the used brine solution through the bed 3 of zeolitic material from distributor 10 to distributor 8.

The valves A, B, C, D and E are all operatively connected by means of a timing and control circuit 66 in ord to control their position to set the system 1 in one of its three states of operation, those states being defined as a water softening cycle, a brine solution application or regeneration cycle and a washing cycle to remove remaining brine from the softening tank 2. As illustrated in FIG. 2, the timing and control circuit 66 is comprised of a timer clock 68 which serves to initiate the regeneration cycle at predetermined intervals, such as periods of low consumption, and to further initiate the mashing cycle after the application of the brine solution. A switching means, illustrated as a cam switch 70, is operatively connected to the timer clock 68 by means of a control circuit 72, said cam switch 70 having a motor 74 which rotates a shaft 76 in a conventional manner to rotate cams 78, 80, 82 and 84. The cam 78 is operable to engage a switch 86 upon its rotation to a certain position to close a circuit 88 operatively coupled to valve D to move valve D to an open position to permit flow through the disposal branch 16 of the discharge line 12. The cam 80 is operable to engage a switch 90 for activating a circuit 92 coupled to valve A to actuate valve A to regulate the flow of brine solution through the brine supply piping section 44 and into the softening tank 2.

The cam 82 is operable to engage a switch 94 for activating a circuit 96 coupled to valves B and C to regulate the flow of fresh water to the brine tank 25 for the regeneration cycle or the softening tank 2 for the washing and softening cycles. The cam 84 is operable to engage a switch 98 for activating a circuit 100 coupled to pump 64 and valve E to operate the pump 64 and one of the valve stems of valve E for the activation of the brine solution recirculating systems 50 during the primary stage of the regeneration cycle. The circuits 88, 92, 96 and 100 are each operatively coupled to a power source 102 for activation of their respective valves and pump. The float switch 55 is operatively connected in a circuit 104 coupling the second valve stem of the valve E to the power source 102 for activation thereof when the brine container 56 is filled to the desired level to divert the brine solution to the drain 17.

In FIG. 3, a modified water softening system designated as 106 is illustrated wherein the brine solution recirculating system 50 is omitted and used brine solution is merely passed to a drain for disposal after a single use. The system 106, however, is otherwise identical to the system 1 illustrated in FIG. 1.

The valves A, B, C and D of system 106 are connected by means of a timing and control circuit 108 in order to regulate the system operation. As illustrated, the timing and control circuit 108 is comprised of a timer clock 110 which serves to initiate the regeneration cycle at predetermined intervals and further, controls the washing cycle after the application of the brine solution. A cam switching means 112 is connected to the timer clock 110 by a control circuit 114. The cam switch 112 includes a motor 116 operatively connected to a shaft 118 having cams 120 and 122 suitably connected thereto. The cam 120 is operable to engage a switch 124 to regulate current flow through a circuit 126 which couples valve D to a power source 128 to control valve D for opening and closing the disposal branch 16. The cam 122 is operable to engage a switch 130 to regulate current flow through a circuit 132 which couples valves A, B and C to power source 128 to simultaneously actuate said valves to initiate the regeneration and washing cycles and to reinstate the system to its normal water softening operation.

In operation, the brine tank is filled with a bed of salt material 29 such as sodium chloride and the timer 68 is set to activate the switching means 70 at predetermined intervals to effect a regeneration of the zeolite bed 3 in the softening tank 2. At the prescribed interval, the timing clock 68 activates motor 74 driving cam 82 into a position which closes switch 94 and opens valves B and C from their normally closed position. The fresh water flow through the distribution line 4 is then diverted through T 40 and valve B into the restrictor T 41. The pressure exerted through the restrictor T 41 downwardly on the diaphragm of the diaphragm valve 38 effects a closing of the distribution line 4, thereby directing the full pressure of the distribution line 4 through the water supply piping section 36 to the brine tank 25.

The cam 84 is then moved into a predetermined position to close switch 98 and thereby activate the brine solution re-use system 50. The pump 64 is actuated to move the brine solution from the brine storage container 56 through the out-flow line 58 and discharge piping 12 and into the lower portion 11 of the zeolitic bed 3 through the distributor 10. The pressure of the pump 64 is employed to drive the brine solution upwardly through the zeolitic bed 3 with a positive flow. The upward positive flow of the brine solution causes the zeolitic material in bed 3 to be fluffed or, in effect, causes a lifting and rotation of the particles of the zeolitic material exposing all surfaces of the zeolitic particles to the brine solution effecting a substantially complete regeneration of the zeolitic material.

The closing of switch 98 also serves to close valve E thereby diverting the flow of the re-used brine solution to the drain 17 as it is removed from the upper portion 7 of the zeolitic bed through the distributor 8. The brine solution passes from the distributor 8 through the vertical piping section 6, valve C, piping section 20 to the disposal branch 16. The valve E is closed during the brine re-use cycle in order to prevent the solution from being re-used several times. The switch 98 is then opened by the rotation of cam 84 to open valve E and deactivate pump 64.

The cam 80 is then rotated into a position which closes switch 90 to open valve A thereby allowing the flow of brine solution from the brine tank 25 to the softening tank 2.

The water filters through the salt bed and is forced out of the brine tank 25 through the outlet pipe 31 and ino the brine supply piping section 44 for passage to the pipe section 12. As the brine solution passes the restrictor T 49, fresh water from the piping section 36 is introduced into the brine solution diluting said brine solution to the desired strength. The brine solution then passes downwardly through the pipe section 12 and outwardly through the distributor 10 into the lower portion 11 of the zeolitic bed 3 in the softening tank 2. The flow pressure from the water distribution line 4 forces the brine solution upwardly through the zeolitic bed 3 with a positive flow. The upward flow pressure of the brine solution causes the zeolitic bed to be fluffed or, in effect, causes a lifting and rotation of the particles of the zeolitic material, causing all the surfaces of the zeolitic particles to be exposed to the brine solution and a substantially complete regeneration of the zeolitic material. When the brine solution passes to the upper portion 7 of the zeolitic bed 3, it is received in the distributor 8 and forced upwardly through the piping section 6, section 20 and through the open valve C and outwardly through the disposal branch 16 of the piping section 12 to the intake pipe 52 and into drain storage container 56. The valve E is closed when the container 56 is filled by the closing of switch 55 thereby diverting the brine solution flow to the drain 17. The valve D at this time is still in a closed position.

The brine solution may be applied to the zeolitic bed 3 for approximately 5 to 10 minutes, then the cams 80 and 82 are rotated out of relation with the switches 90 and 94 closing said valves A, B and C. The closing of valve B allows the pressure on the diaphragm of the diaphargm valve 38 to be relieved, thereby opening the water distribution line 4 downstream to the T 5, and the washing cycle or process is initiated.

The cam 78 at this time engages switch 86 and closes the circuit 88 to valve D, thereby actuating valve D to an open position. As the fresh water moves through the distribution line 4 and downwardly through the piping section 6, it is forced outwardly into the upper portion 7 of the zeolitic bed 3 and downwardly through the zeolitic bed 3 in a reverse direction from the direction of application of the brine solution causing a thorough washing and a settling of the zeolitic bed. The washing water then passes through the distributor 10 and upwardly through the pipe section 12, the valve D, and the disposal branch 16 into drain 17. The flushing or washing action may be continued for 15 to 20 minutes to remove all traces of salt from the zeolitic bed 3. Upon completion of the washing cycle, the cam 78 rotates out of contact with the switch 86, thereby opening the circuit 88 to valve D causing valve D to return to its normally closed position. The fresh water then passing through the zeolitic bed 3 is directed upwardly through the pipe section 12 and into the distribution branch 15 thereof providing an availability of soft water at the tap 13.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A method of softening pressurized hard water by the passage of said water through a bed of base exchange material and regenerating said exchange material, comprising:

(a) normally flowing hard water from a distribution line downwardly in a treating chamber and through a bed of base exchange material therein to soften said water, (b) diverting a portion of the flow of water from the distribution line to a brine containing chamber to form a concentrated brine solution, (c) collecting a brine solution in a collecting chamber, (d) stopping the flow of hard water to the treating chamber, (e) pumping brine solution from the collecting chamber and discharging said solution under pressure at the bottom portion of the treating chamber for upward flow through the bed of base exchange material as a primary treatment to agitate said material and expose substantially all of the base material to the brine solution, (f) discharging the used brine solution from the upper portion of the treating chamber to a waste disposal, (g) directing a flow under pressure of said hard water from the distribution line to the brine chamber to effect flow of the brine solution to the bottom portion of the treating chamber for upward flow through the bed of base exchange material under pressure of the water distribution line as a secondary treatment to agitate said material to expose substantially all of the base material to the brine solution, (h) discharging the used secondary treatment brine solution from the upper portion of the treating chamber, (i) selectively directing said discharged used secondary treatment brine solution to a waste disposal and the collecting chamber whereby a selected quantity of the secondary treatment brine solution used in the final treating phase is collected for use in the next regeneration cycle, (j) stopping flow of hard water under pressure to the brine chamber and flow of brine solution to the treating chamber, (k) opening flow of the hard water from the distribution line to the treating chamber for flow through the bed of exchange material and discharge of said water from the treating chamber to a waste disposal to rinse and remove remaining brine solution from said bed of base exchange material, and (l) closing the discharge of the rinse water to the waste disposal and restoring normal flow of water through the regenerated bed of base exchange material.

2. A method as recited in claim 1 wherein the rinse water is flowed downwardly in the treating chamber through the bed of base exchange material in a direction reverse to the flow of the brine solution through the bed, the rinse water being discharged from the bottom portion of the treating chamber for flow to a waste disposal.

References Cited

UNITED STATES PATENTS

| | | | |
|---|---|---|---|
| Re. 15,618 | 6/1923 | Duggan | 210—35 |
| 3,063,937 | 11/1962 | McAuley | 210—35 |
| 3,240,699 | 3/1966 | Duff et al. | 210—190 X |

SAMIH N. ZAHARNA, *Primary Examiner.*

U.S. Cl. X.R.

210—140, 190